Figure 1:
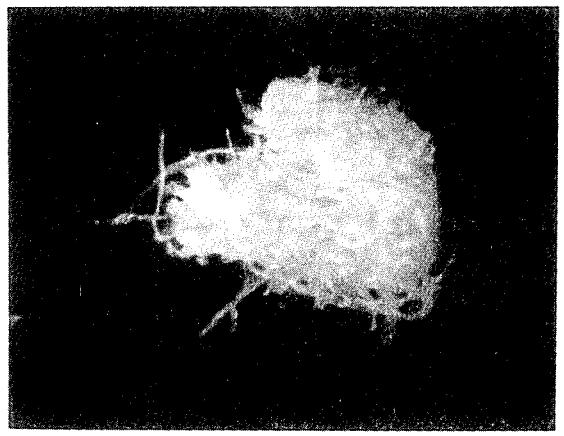

United States Patent [19]
Assarsson et al.

[11] 3,901,236
[45] Aug. 26, 1975

[54] DISPOSABLE ABSORBENT ARTICLES CONTAINING HYDROGEL COMPOSITES HAVING IMPROVED FLUID ABSORPTION EFFICIENCIES AND PROCESSES FOR PREPARATION

[75] Inventors: Per G. Assarsson, Montclair; Paul A. King, Warwick; Steven N. Yen, Highland Mills, all of N.Y.

[73] Assignee: Union Carbide Corporation, New York, N.Y.

[22] Filed: July 29, 1974

[21] Appl. No.: 492,897

[52] U.S. Cl. ............... 128/284; 128/156; 128/287; 128/290 R; 117/16; 260/88.1
[51] Int. Cl. .... A61f 13/16; A61f 13/20; A61l 15/00
[58] Field of Search........ 128/284, 156, 287, 290 R, 128/285, 268; 117/16, 27, 140, 136

[56] References Cited
UNITED STATES PATENTS
| | | | |
|---|---|---|---|
| 3,419,006 | 12/1968 | King | 128/268 |
| 3,628,534 | 12/1971 | Donohue | 128/285 |
| 3,670,731 | 6/1972 | Harmon | 128/156 X |
| 3,849,238 | 11/1974 | Gould | 128/156 X |

*Primary Examiner*—Aldrich F. Medbery
*Attorney, Agent, or Firm*—W. R. Moran

[57] ABSTRACT

Hydrogel composites are provided having improved fluid absorption efficiencies which render them especially useful in disposable absorbent articles, such as diapers, catamenial devices and the like. The hydrogels are in particulate form, each particle or agglomerate of particles being substantially coated with fibers, a portion of which fibers extend from the particle. The fibers enhance the rate at which the hydrogel absorbs aqueous fluids and also serve to maintain the fluid in close proximity to the hydrogel. The extended fibers serve to anchor the hydrogel particle when it is contained in a fibrous or cellular matrix.

23 Claims, 7 Drawing Figures

DISPOSABLE ABSORBENT ARTICLES CONTAINING HYDROGEL COMPOSITES HAVING IMPROVED FLUID ABSORPTION EFFICIENCIES AND PROCESSES FOR PREPARATION

This invention relates in general to disposable absorbent articles containing hydrogel composites having improved aqueous fluid absorption efficiencies. In one aspect this invention is directed to hydrogel composites which anchor themselves in fibrous or cellular matrices. In a further aspect this invention relates to a process for preparing hydrogel composites.

In recent years several articles have appeared in the literature disclosing the use of a variety of insolubilized hydrogels for the absorption and retention of aqueous fluids. For example, U.S. Pat. No. 3,419,006 is directed to the use of cross-linked poly(alkylene oxides) as a burn and wound dressing. The hydrogel has the ability to absorb and retain most exudate from the burn or wound as well as to allow visual inspection of the wound through the transparent gel. U.S. Pat. Nos. 3,664,343, 3,783,872, 3,669,103 and 3,670,731 are also directed to the use of insolubilized hydrogels in disposable absorbent articles, such as diapers and catamenial devices. The hydrogels possess the ability to absorb many times their weight of aqueous fluids and to retain the fluids even under moderate pressures.

However, for many applications, in disposable articles, such as diapers, it is essential that the rate of body exudate and fluid absorption and efficiencies be maximized. Moreover, if the hydrogel is employed in particulate form, it is important that the particles be essentially immobile within the fibrous matrix. Settling of the particles as might occur during shipping or use would reduce their utility.

It has now been found that hydrogel composites can be prepared which have improved aqueous fluid absorption efficiencies when contained in an absorbent article, i.e., in situ, as compared to the sum of the efficiencies of the individual components. Moreover, the hydrogel composites prepared by the process of this invention will be essentially immobilized when contained in a fibrous matrix.

Accordingly, one or more of the following objects can be achieved by the practice of this invention. It is an object of this invention to provide disposable absorbent articles containing hydrogel composites having improved in situ fluid absorption efficiencies. Another object of this invention is to provide hydrogel/fiber composites which have increased in situ fluid retention efficiencies over the sum total of the individual components alone. A further object of this invention is to provide hydrogel/fiber composites which are essentially immobilized when contained in a fibrous matrix. A still further object of this invention is to provide a process for the preparation of they hydrogel/fiber composites. Yet another object is to provide diapers containing the hydrogel/fiber composite of this invention. A further object is to provide catamenial devices containing the hydrogel/fiber composites. These and other objects will readily become apparent to those skilled in the art in the light of the teachings herein set forth.

In its broad aspect, this invention is directed to disposable, absorbent articles contained hydrogel composites having improved in situ fluid absorption efficiencies, and a process for their preparation. The invention also encompasses the hydrogel composites themselves.

The composites are comprised of hydrogels having fibers of particular lengths and diameters which fibers cover a substantial portion of the hydrogel and wherein at least some of the fibers have a portion thereof extending outwardly from the hydrogel composite surface.

Figure 3:
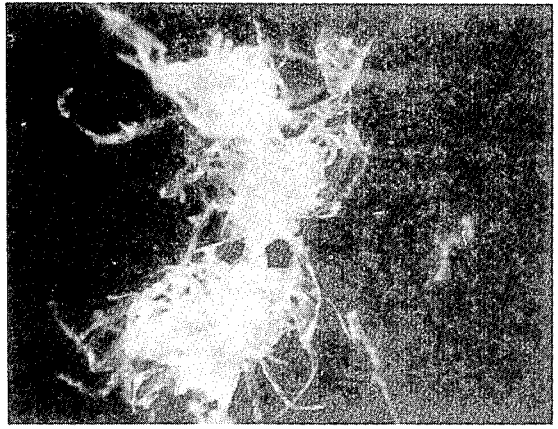
Figure 4:
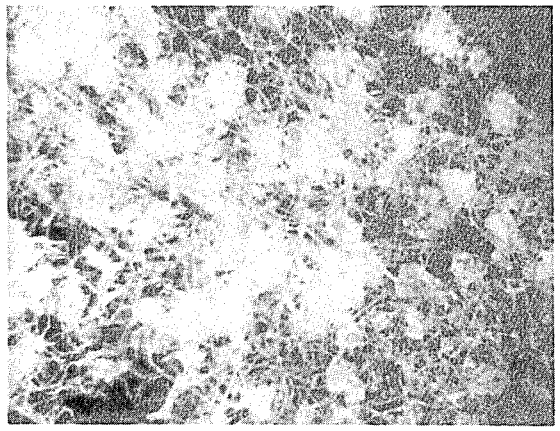

A more detailed understanding of the invention will be had by reference to the drawings. FIGS. 1, 2, 5 and 6 are photomicrographs of coated particles of insolubilized poly(ethylene oxide). FIGS. 3 and 4 are photomicrographs of coated particles of insolubilized polyacrylamide. FIG. 7 is an enlarged view of a coated particle of insolubilized poly(ethylene oxide).

With reference to the drawings, FIG. 1 is a photomicrograph taken through an optical microscope and which had an original magnification of approximately 50 X. In FIG. 1 is shown an individual particle of insolubilized poly(ethylene oxide) having a coating of bleached sulfate pulp fibers, the coated particle having been prepared in accordance with the process of this invention. Prior to being contacted with the fibers the poly(ethylene oxide) has a particle size range such that essentially all of it passed through a 10 mesh screen and essentially all of it was retained on a 120 mesh screen. The sulfate pulp fibers employed had an average length of 0.66 millimeters. Insolubilization was effected by irradiation after the fiber coating was applied.

Figure 2:
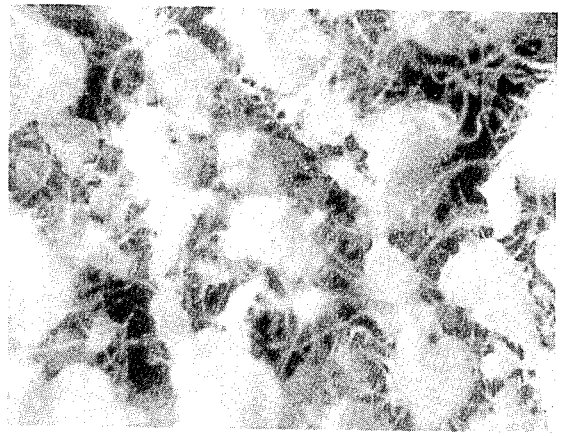

FIG. 2 is a photomicrograph taken through an optical microscope and shows a plurality of the same particles shown in FIG. 1 but an an original magnification of approximately 20 X.

FIG. 3 is a photomicrograph taken through an optical microscope at an original magnification of approximately 50 X. The Figure shows several particles of insolubilized partially hydrolyzed polyacrylamide supplied by Dow Chemical Corporation under the tradename Dow XD-1300. The particles were coated with bleached sulfite pulp fibers in accordance with the process of this invention. Prior to being contacted with the fibers the polyacrylamide had a particle size range such that essentially all of it passed through a 70 mesh screen and essentially all of it was retained on a 200 mesh screen. The sulfite pulp fibers had an average length of about 0.50 millimeters. Insolubilization had been effected by chemical means prior to coating with fibers.

FIG. 4 is a photomicrograph taken through an optical microscope and shows a plurality of the same particles shown in FIG. 3 but at an original magnification of approximately 20 X.

Figure 5:

FIG. 5 is a photomicrogaph taken through an optical microscope and which had an original magnification of approximately 50 X. In FIG. 5 is shown an individual particle of insolubilized poly(ethylene oxide) having a coating of bleached sulfite pulp fibers which was prepared in accordance with the process of this invention. The poly(ethylene oxide) had a particle size range, prior to coating, such that essentially all of it passed through a 10 mesh screen and essentially all of it was retained on a 160 mesh screen. The fibers had an average length of about 0.5 millimeters. The poly(ethylene oxide) was insolubilized chemically prior to being contacted with the fibers.

Figure 6:
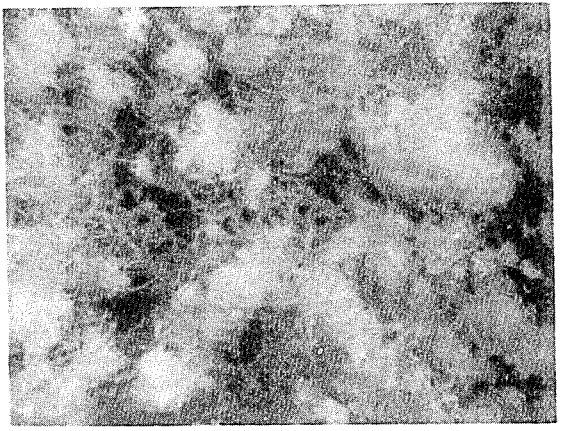
Figure 7:

FIG. 6 is a photomicrograph taken through an optical microscope and shows a plurality of the same particles shown in FIG. 5 but at an original magnification of approximately 20 X.

FIG. 7, is a photomicrograph taken through scanning electron microscope and which had an original magnification of 105 X. In FIG. 7 is shown essentially one particle of poly(ethylene oxide) having a coating of bleached sulfate pulp fibers having an average length of 0.66 millimeters. The poly(ethylene oxide) had a particle size range prior to coating such that essentially all of it passed through a 10 mesh screen and essentially all of it was retained on a 120 mesh screen. The poly(ethylene oxide) was rendered insoluble by exposure to irradiation after being contacted with the fibers.

As hereinbefore indicated, the novel composites of this invention are comprised of at least one hydrogel. By the term "hydrogel" as employed in the specification and appended claims is meant an inorganic or organic compound capable of absorbing aqueous fluids and retaining them under moderate pressures. In many instances it may be desirable to insolubilize the hydrogel to optimize its use for the practice of this invention.

Thus the terms "insoluble" or "insolubilize" as employed throughout the specification are utilized herein to refer to the formation of a material, a substantial portion of which is essentially insoluble in aqueous media. These materials can swell and absorb many times their weight in water. The insolubilization can be effected by a wide variety of methods and includes, but is not limited to, ionizing and nonionizing radiation, and cross-linking through covalent, ionic and other types of bonds.

In practice a wide variety of hydrogels can be employed in the preparation of the composites of this invention. An important requirement of the particular hydrogel chosen is that it be capable of absorbing relatively large quantities of aqueous liquids. This includes both inorganic compounds such as silica gels and organic compounds such as those polymers which are crosslinked by covalent, ionic, Van der Waal forces, or hydrogen bonding.

Illustrative polymers which can be employed as the hydrogels include, among others, poly(ethylene oxide), polyvinyl pyrrolidone, polyacrylamide, partially hydrolyzed polyacrylamide, polyvinylalcohol, maleic anhydride-vinylether copolymers, maleic anhydride-vinyl pyrrolidone, polyacrylic acid, ethylene-maleic anhydride copolymers, polyvinylethers, dextran, agar, gelatin, hydroxy propyl cellulose, methyl cellulose, carboxymethyl cellulose, hydroxyethyl-carboxymethyl cellulose, hydroxyethyl cellulose, propyleneglycol alginate, sodium alginate, polyethyleneimine, polyvinyl alkyl pyridinium halides, polyvinylmorpholinone, polymers and copolymers of vinyl morpholinone, polymers and copolymers of vinyl sulfonic acid and their ammonium and alkali metal salts, amides and alkali metal or ammonium salts derived from copolymers of maleic anhydride with vinyl methyl ether, with vinyl-pyrrolidone, with vinyl morpholinone or with a mono-olefinic hydrocarbon, polymers and copolymers of acrolein modified by reaction with an alkali metal hydroxide or alkali metal bisulfite and copolymers of sulfer dioxide with allyl alcohol, allyl ether of glycerol or allyl ether of ethylene glycol or a polyethylene glycol, polyvinyl-n-butyl-pyridinium bromide, polyproline, natural starches, modified starches, such as disclosed in U.S. Pat. No. 3,661,815 and U.S. patent application Ser. No. 456,911, filed Mar. 3, 1974, casein, proteins polymethacrylic acid, polyvinylsulfonic acid, polystyrene sulfonic acid, polyvinylamine, ammonium polyacrylates, hydroxyalkyl acrylates, hydroxyalkyl methacrylates, hydroxyalkoxyalkyl acrylates, hydroxyalkoxyalkyl methacrylates, polyethylene oxide adduct esters of acrylic and methacrylic acids, alkoxy acrylates and methacrylates, alkoxyalkyl acrylates and methacrylates, partially hydrolized polyacrylamides, polyvinylpyridine -vinylphridine quaternary salts, polymerized monesters of olefinic acids, polymerized diesters of olefinic acids, acrylamide and difunctional polymerizable materials, e.g. diacids, diesters or diamides, and the like.

It should be noted that the instant invention is not limited to the use of only one of the materials listed above but includes mixtures of two or more materials. Additionally, it is also possible to employ copolymers of the aforementioned compounds or materials similar to these. For example, copolymers of ethylene oxide and minor or major amounts of other alkylene oxides can also be used. Moreover, many of the salts of the aforementioned polymers can be employed. It is also possible to use cocrosslinked polymers of the type disclosed in Belgian Pat. No. 793,650.

As previously indicated, the hydrogel is in particulate form thus by the term "hydrogel particle" as employed throughout the specification and appended claims is meant a single particle or an aggregate of several sub-particles.

A wide variety of natural and synthetic fibers can be employed in the preparation of the composites of this invention. It is, of course, preferred to use those fibers which are inexpensive and readily available. Illustrative fibers include, but are not limited to, wood and wood products, such as wood pulp fibers, cellulose flocs, cotton linter flocs and the like; inorganic fibers, synthetic fibers such as nylon flocs, rayon flocs and the like. It is also possible to use mixtures of one or more natural fibers or one or more synthetic fibers, or combinations of the two. Preferred fibers are those which are hydrophilic in nature. However, hydrophobic fibers can also be used in conjunction with the hydrophilic fibers, particularly as the extending fibers which serve to anchor the hydrogel particle in a fibrous a cellular matrix. It is also possible to treat the fiber surfaces by an appropriate method to render them more or less hydrophilic or hydrophobic.

While not wishing to be bound as to the theory of how the fibers enhance the ability of the hydrogel to absorb fluids more efficiently, it is believed that the fibers which coat the hydrogel particle aid in entraping the fluid and by capillary action conduct the fluid to the surface of the hydrogel where it is absorbed. In contrast, the absorption of fluid passing over the surface of an uncoated hydrogel particle, would be dependent solely upon the rate at which the particular hydrogel can absorb fluids. Additionally, those fibers which have a portion extending from the hydrogel particle surface can serve to anchor the particle in a fibrous or cellular matrix. Thus, the fibers serve at least three purposes, i.e., (a) they enhance the rate of fluid absorption by capillary action, (b) they retain fluid in close proximity to the hydrogel surface for swelling, and (c) they serve to anchor the hydrogel particles within any fibrous or cellular matrix in which they may have been imbedded.

In practice, it has been found that to obtain optimum fluid absorption efficiencies, in situ, it is necessary to control certain variables within specified limits. It has been observed that the hydrogel particle size prior to being contacted with the fibers should be such that essentially all of it passes through a 5 mesh screen, as measured on U.S. Standard Sieve Series. As hereinafter indicated, while it is difficult to analyze particle size distribution of the coated particles, it has been found that essentially all of the hydrogel composits composites be capable of passing through a 5 mesh screen. The fibers should be of sufficient length so that at least some of the fibers extend outward from the surface of the hydrogel. Hence, fibers of from about 0.1 to about 5.0 millimeters in length are preferred. It is of course, possible to use fibers of varying lengths, the longer ones serving to anchor the particle and the shorter ones to coat it. Although fiber diameter is not narrowly critical it is preferred to use those fibers wherein the ratio of length to diameter is at least about 5:1.

The proportion of hydrogel to fiber should be such that the hydrogel/fiber composite is comprised of at least about 20 weight per cent hydrogel. A particularly satisfactory hydrogel composite is comprised of approximately equal weights of hydrogel and fibers. As indicated in the examples, ratios of hydrogel to fiber of from 50:50 to 75:25 exhibited a synergistic effect in the absorption of fluids. The increase retention efficiency of those hyrogel/fiber composites when employed in fibrous matrices was greater than the sum total of the individual components alone.

The hydrogel composites of this invention are conveniently prepared by blending a mixture of at least one hydrogel and sufficient fibers to cover a substantial portion of the surface area of the hydrogel under conditions wherein a positive adherence of the fibers to the hydrogel surface will occur. In practice, a variety of methods can be employed to promote adherence of the fibers to hydrogel. For example, the hydrogel can be subjected to heat treatment to soften the hydrogel surface to aid in attaching the fibers. Alternatively, the hydrogel or the hydrogel/fiber mixture can be contacted with a material which will also soften the surface. For example, crushed ice, aqueous fluids of other materials can be employed to aid in attaching fibers. If an aqueous fluid is employed, it can be added to the hydrogel either before the addition of the fibers or during the blending of the fibers and hydrogel. It is also possible to employ fibers which are coated with a material that will provide a positive adherence to the hydrogel.

Although water is the preferred aqueous fluid, other liquids or mixtures thereof, which are capable of swelling the hydrogel can be employed. For example, water-alcohol mixtures, glycols, benzene and the like can be utilized in the preparation of the composites of this invention. The particular aqueous fluid being employed will, of course, be determined by the chemical composition of the hydrogel being coated. In general the fluid can be added by any convenient method. In a preferred method the fluid is added as a finely divided spray and while the hydrogel or hydrogel-fiber mixture is under thorough agitation.

In most instances, the amount of fluid added need only be a minimum amount, i.e., that sufficient to soften the hydrogel so that the fibers adhere thereto and/or enable the hydrogel to be essentially completely insolubilized by crosslinking by irradiation or by chemical means. As previously indicated, the amount should preferably not exceed that at which the mixture is maintained in a free-flowing particulate form for processes which handle particulate matter. However, for other processing techniques the amount of fluid may be above or below that at which the mixture is in a free-flowing state. In general, the fluid content can range from about 15 to about 80 weight per cent based on the mixture of hydrogel and fiber. For some applications, it may be desirable to have a product with a higher fluid content, and in such instances this figure can be exceeded. For instances, as indicated in the examples, when the hydrogel and fibers are present in a 1:1 ratio, and the hydrogel is insolubilized by irradiation, the water content may be in excess of 80 per cent.

As previously indicated, it may be desirable to effect insolubilization of the hydrogel to optimize its in situ absorption efficiencies. In such cases a wide variety of insolubilization methods can be employed. For example ionizing and nonionizing radiation, chemical cross-linking, and the like, can all be used. The particular method chosen will largely be determined by the chemical nature of the hydrogel.

For example, U.S. Pat. No. 3,734,876 describes a method for chemically cross-linking poly(alkylene oxides) by contacting the polymer with a cross-linking agent in the presence of a free radical catalyst. Illustrative cross-linking agents disclosed include compounds such as 1,4-butylene glycol diacrylate, tetraethylene glycol diacrylate, polyethylene glycol diacrylate, methylene bisacrylamide and the like. Typical free radical catalysts disclosed are azobisisobutyronitrile, benzoyl peroxide, 2,4-dichlorobenzoyl peroxide, and the like.

In addition to chemical cross-linking by means of a free-radical catalyst, other methods can be employed to prepare the hydrogels. For example, U.S. Pat. No. 3,661,815 is directed to a process for preparing an alkali metal carboxylate salt of a starch polyacrylonitrile graft copolymer. The copolymer is saponified with an aqueous methanolic or aqueous ethanolic solution of an alkali base consisting of sodium hydroxide, lithum hydroxide or potassium hydroxide. It is indicated that the saponified copolymers are characterized as water insoluble granular solids having the ability to absorb water in amounts in excess of 50 parts per part of polymer while retaining their granular character.

U.S. Pat. No. 3,670,731 also discloses hydrocolloid absorbent materials such as a cross-linked sulfonated polystyrene or a linear polyacrylamide crosslinked with a nonconjugated divinyl compound, such as methylene bis acrylamide. Alternatively, it is indicated in the patent that an acrylamide can be copolymerized with a non-conjugated divinyl compound in the presence of peroxide catalysts or by photo polymerization, such as for example, with riboflavin activator.

In addition the aforementioned methods of affecting insolubilization of the hydrogel, another method is to subject the polymer to sufficient ionizing radiation to crosslink and insolubilize the polymer forming thereby a water-insoluble hydrophilic product. As used herein, the term "ionizing radiation" includes that radiation which has sufficient energy to cause electronic excitation and/or ionization in the polymer molecules but which does not have sufficient energy to affect the nuclei of the constituent atoms. Convenient sources of suitable ionizing radiation are gamma ray-producing radioactive isotopes such as $^{60}Co$ and $^{137}Cs$, spent nuclear fuel elements, X-rays such as those produced by conventional X-ray machines, and electrons produced by such means as Van de Graaff accelerators, linear electron accelerators, resonant transformers, and the like. Suitable ionizing radiation for use in the present invention will generally have an energy level in the range from about 0.05 MeV to about 20 MeV.

The irradiation of the non-crosslinked (water soluble) polymers can be carried out in the air, in a vacuum, or under various gaseous atmospheres. Any conventional method can be used to bring the polymer into contact with the ionizing radiation. Suitable methods are well known and understood by those skilled in the art.

The novel hydrogel/fiber composites prepared by this invention can also contain a wide variety of additives. For instance, various cross-linking enhancers such as methylene-bis-acrylamide, can be added prior to irradiation. Various stabilizers binders, dispersants, dyes, pigments, diluents and the like can be employed if desired. While some of these would be added after the particulate materials have been prepared, others could be added during the blending stage of the process. For example, if a stabilizer is desired, it can be added to the liquid which will be sprayed on the mixture.

An important aspect of the hydrogel/fiber composites of this invention is that they have improved retention properties when incorporated into fibrous matrices, such as cellulosic pads. Thus, when a composite hydrogel is incorporated into an absorbent pad made from fibers the particles are essentially fixed in place such that they are prevented from migration or shakeout during handling before or during its use. This is a recognized problem for those familiar with the art. Attempts have been described in the patent literature to alleviate this problem, i.e., steam treatment of the hydrogel containing pad as described in U.S. Pat. No. 3,661,154. The present invention discloses a novel approach wherein some of the fibers, attached to the hydrogel/fiber composites, act as anchors in affixing these particles in the absorbent pad fiber network. As previously indicated, the accompanying drawings clearly show how some of the fibers which are attached to the hydrogel particle but have portions which are free to intertwine with fibers of a matrix in which they are placed.

Examples 19 to 31 illustrate this anchoring effect. The absorption pads employed were made either on commercial airlaying equipment which produces a uniformly distributed pattern of particles in the pad matrix or by layering the particles between two airlayed fibrous pads. In the examles, the absorbent fiber pads were made from bleached sulfate wood pulp. Although it is understood that other fiber pads could also be employed.

The hydrogel composites can also be employed in a cellular matrix wherein the extended fibers serve to anchor the hydrogel particle in the cellular openings.

The hydrogel composites of this invention are useful in a wide variety of fields. They are particularly useful because they possess the ability to incorporate very large amounts of water in the order of 5 to 1,000 times their dry weight. Moreover, in addition to possessing the ability to incorporate large amounts of aqueous fluids and they will retain such liquids even under moderate pressures.

In general, the materials are useful for increasing the absorbency of any known or commercially avialable disposable, article. They are of particular interest as an absorbing media for diapers, or catamenial devices such as sanitary napkins, tampons, incontinent pads, bandages, sponges, colostomy pads, other disposable absorbent pads and the like.

The hydrogel composites are of particular interest for incorporating into diapers of the type disclosed in U.S. Pat. No. 3,814,101. Similarly, they can be incorporated into tampons or sanitary napkins of the type disclosed in U.S. Pat. Nos. 3,121,427; 3,070,095; 3,812,856 and the like.

The hydrogel/fiber composites disclosed in the following examples have been prepared in at least four different ways. The detailed mixing procedures employed are described below:

1. Lodige Blender, large: A solids-liquid blender with a handling capacity of 300 lbs. solids was charged with the prescribed amounts of polymer and fiber and mixed intimately as water was introduced through spray nozzles inside the mixing cavity. The mixing step was continued until all the preweighed water was added and for a short time thereafter. The total mixing cycle took on the average 30 minutes. The resultant wet mixes were fairly free flowing and could be moved on standard conveying equipment without difficulty. Polyethylene oxide polymer was used in this preparation procedure and all the mixes were subsequently subjected to ionizing radiation for the cross-linking step with the following conditions: a Van de Graaff electron accelerator with an energy of 1.5 MeV at an operating current of 1.5 mAmp was used and the particulate, wet powder conveyed under the beam at a rate of 50 fpm. The dose was calculated to be approximately 0.3 Mrad. The wet irradiated mixes were air conveyed to a holding bin and then dried in a hot air fluidized bed drier.

2. Lodige Blender, small: A solids-liquid blender with a handling capacity of 30 lbs. solids was charged with the prescribed amounts of polymer and fiber filler and mixed intimately as water was introduced through spray nozzles inside the mixing cavity. The mixing step was continued until all the preweighed water was added and for a short time thereafter. The total mixing cycle took on the average 10 to 15 minutes. The resultant wet mixes were fairly free flowing and could be moved on standard conveying equipment without difficulty. Only polyethylene oxide polymer was used in this preparation procedure and all the mixes were subsequently subjected to ionizing radiation for the crosslinking step with the following conditions: a Van de Graaff electron accelerator with an energy of 1.5 MeV at an operating current of 1.5 mAmp was used and the particulate wet powder conveyed under the beam at a rate of 50 fpm. The dose was calculated to be approximately 0.3 Mrad. The irradiated wet mixes were dried at ambient temperature and humidity and then ground in a Cumberland Grinder using a 1/16 inch screen.

3. Vee-Blender: A Patterson-Kelley twin shell blender having a handling capacity of about 3 lbs. solids, and a liquid dispersion bar was charged with the prescribed amounts of polymer or hydrogel and fiber filler and mixed intimtely as water was introduced through spray nozzles inside the mixing chamber. The mixing step was continued until all the preweighed water was added and for a short time thereafter. The total mixing cycle took on the average 15 minutes.

In some cases the subsequent crosslinking step through ionizing radiation was carried out as described in the preparations above and at a dose indicated in the examples. In other cases the ionizing radiation step was omitted. All wet hydrogel/fiber mixtures were dried at ambinet temperature and humidity and then screened through a 10 mesh sieve.

4. Hand Mixed: A prescribed amount of hydrogel and fiber filler were mixed in a beaker by hand as a sufficient amount of water was added slowly until a damp or wet mixture resulted with no free liquid. This wet mixture was then dried at ambient temperature and humidity. A Waring Blender was used to break up the dried material into small particles and the particles screened through a 10 mesh sieve.

The increased fluid absorption efficiencies are based on the X-values, (grams of fluid per gram of dry absorbent), found for the hydrogel fiber combination compared to that of equivalent amounts of the same hydrogel and fiber measured separately. A wide variety of hydrogels has been included in the examples to show that the fluid absorption improvements can be ascribed to the uniqueness of the hydrogel/fiber combinations and not the chemical composition of these hydrogels or fibers. Specifically, the following hydrogels have been used in the examples for improved absorption efficiency and retention studies.

1. Polyethylene oxide (Polyox[1] Gel I): high molecular weight polymer crosslinked through ionizing radiation. The details of its preparation are described in U.S. Pat. Nos. 3,664,343 and 3,783,872.

[1] Union Carbide Corporation Trademark for poly(ethylene oxide).

2. Polyethylene oxide (POLYOX Gel II): high molecular weight polymer chemically crosslinked with di- and tri-functional acrylate compounds. The details of its preparation are described in Belgian Pat. No. 785,858.

3. Polyetheylene oxide (POLYOX Gel III): high molecular weight polymer chemically crosslinked with acrylic acid. The details of its preparation are described in U.S. Pat. No. 3,763,277.

4. Dow XD-1,300: commercially available hydrogel, in particulate form, produced from chemically crosslinked, partially hydrolyzed polyacrylamide. Supplied by Dow Chemical Corporation.

5. AA/AAM Hydrogel: Hydrogel produced by the treatment of sodium acrylate and acrylamide in an aqueous solution with ionizing radiation.

6. Polymer 35-A-100: experimental granular hydrogel obtained from the saponifaction of starch-acrylonitrile graft copolymers in aqueous-alcoholic media. Supplied by Grain Processing Corporation.

All hydrogel/fiber compositions based on polyethylene oxide have been compared to a parent hydrogel made by the irradiation of a 4% solution in water, to a dose of 5 Mrad, with a Van de Graaff electron accelerator operating at an energy of 1.5 MeV. The resultant gel was dried and ground to a powder with approximately the same particle size distribution as the polymer used in making the hydrogel/fiber composites.

Further examples of hydrogel/fiber absorption values have been obtained from the additional polymer systems set forth below. In these cases no comparison values were obtained for the pure hydrogel.

7. Hydroxyethyl Cellulose: commercially available, high molecular weight polymer from Union Carbide Corporation. The preparation of the hydrogel/fiber composite was done using the Vee-blander technique in the mixing step and the resultant wet powder mixture crosslinked with an ionizing radiation dose of 0.5 Mrad.

8. Carboxymethyl Cellulose: commercially available, high molecular weight polymer from Hercules Chemical Company. The preparation of the hydrogel/fiber composite was done using the Vee-Blender technique in the mixing step and the resultant wet powder mixture crosslinked with an ionizing radiation dose of 1.0 Mrad.

9. Polyacrylamide: commercially available, high molecular weight polymer from American Cyanamide Corporation. The preparation of the hydrogel/fiber composite was done using the Vee-blender technique in the mixing step and the resultant wet powder mixture crosslinked with an ionizing radiation dose of 0.3 Mrad.

The particle size of the different hydrogel starting materials varied from about 10 mesh to 300 mesh before the fiber combination process. The resulting hydrogel/fiber products are difficult to analyze as to particle size distribution because of the inherent entanglement of attached fibers, however, each hydrogel/fiber product was sifted through a 10 mesh screen prior to being used in the examples.

The ratio of hydrogel to fiber has been varied in a number of examples. The preferable limits range from about 80% fibers on the individual hydrogel particle down to about 10% fibers. The examples in this application have one series of ratio changes for polyethylene oxide: bleached sulfate pulp fibers at 50%, 40%, 33% and 25% fiber content (Examples 1, 2, 4 and 3), while two other compositions using a different hydrogel have been prepared containing 50% and 33% fibers (Examples 6, 7, 12 and 13).

The fiber types which have been employed in the examples are all commercially available from different sources. There are, in general, two characteristics of the fibers which, at this point, can be factored out as important to the fluid absorption efficiency of the hydrogel/fiber composite: (a) length of fiber, and (b) hydrophobicity of the fiber.

The preferred average fiber lengths range from about 1.5 mm to 0.1 mm but longer or shorter fibers can be used. It should be pointed out that the utilization of mixtures of different average length fibers, of the same composition, may be useful outside this range. In addition combination of fibers of different composition may also be used. The hydrophobicity of a fiber has an effect on the fluid absorption efficiency, the more hydrophobic the fiber the less is the efficiency increase.

The examples here include the following cellulosic fiber variations:

Bleached sulfate pulp fibers average fiber length — ~ 0.66 mm.

Bleached sulfite pulp fibers* C-40 — average fiber length — > 0.50 mm.

Bleached sulfite pulp fibers* C-100 — average fiber length — ~ 0.50 mm.

Bleached sulfite pulp fibers* C-200 — average fiber length — < 0.50 mm.

Bleached sulfite pulp fibers RB-100 — average fiber length — ~ 0.47 mm.

Bleached sulfite hardwood fibers** JBH — average fiber length — ~ 1.23 mm.

Bleached cotton linter fibers* CL-100 average fiber length — ~ 0.50 mm.

*Samples from International Fiber Corporation. **ITT Rayonier, Inc.

EXAMPLE 1

The absorption values for hydrogel/fiber composites were determined from saline fluid addition experiments carried out in the following manner: two 6 inch × 8 inch absorption pads made from air-laid sulfate wood pulp fibers, weighing about 6 grams, were sandwiched around a wadding laminate containing 0.25 grams of the hydrogel/fiber composite evenly distributed over the laminate area. Saline fluid (0.3 N NaCl in water) in volumes of 20, 30, 40 and 50 cc, was poured slowly onto the surface, of separate pads, and allowed to equilibrate for 30 minutes while covered. After this time the wet laminate containing the hydrogel or hydrogel/fiber absorbent was removed and weighed separately from the upper and lower portions of the fluff pads. Corrections of an average weight for wet wadding laminate only were subtracted at different fluid additions. The difference is the weight of the fluid absorbed in these particles. From this number an absorption X-value grams saline fluid/grams hydrogel composite can be calculated.

Efficiency increases have been calculated from these data for the different hydrogel/fiber composites by subtracting out the absorption values obtained in like manner for the equivalent weights of the parent of comparable hydrogels and fibers separately.

In this example, a blend of poly(ethylene oxide) and bleached sulfate pulp fibers in a weight ratio of 1:1 were employed and evaluated. The procedure employed and the results obtained are set forth below:

Mixing Procedure:
Lodige Blender, large
120 lbs. POLYOX
120 lbs. Pulp Fibers
300 lbs. Water
2.2 lbs. Polyethyleneimine
Radiation Dose: 0.3 Mrad
Absorption values at fluid loadings:

| | |
|---|---|
| 20 cc | 12.2X |
| 30 cc | 13.5X |
| 40 cc | 17.8X |
| 50 cc | 19.8X |

Absorption values of POLYOX Gel I (irradiated at 5 Mrad).

| Fluid Loading | g Fluid/g Hydrogel |
|---|---|
| 20 cc | 7.6 |
| 30 cc | 8.9 |
| 40 cc | 12.7 |
| 50 cc | 15.9 |

Absorption values of bleached sulfate pulp fibers:

| Fluid Loading | g Fluid/g Fiber |
|---|---|
| 20 cc | 3.9 |
| 30 cc | 5.0 |
| 40 cc | 6.8 |
| 50 cc | 6.7 |

Increased efficiency of hydrogel/fiber particles:

| Fluid Loading | g Fluid g Hydrogel/Fiber | | g Fluid .5 g Hydrogel | | g Fluid .5 g Fiber | | g Additional Fluid Absorbed g Hydrogel/Fiber | % Increased Efficiency |
|---|---|---|---|---|---|---|---|---|
| 20 cc | 12.2 | — | 3.8 | — | 1.95 | = | 6.45 | 112% |
| 30 cc | 13.5 | — | 4.45 | — | 2.50 | = | 6.55 | 94% |
| 40 cc | 17.8 | — | 6.35 | — | 3.40 | = | 8.05 | 83% |
| 50 cc | 19.8 | — | 7.95 | — | 3.35 | = | 8.50 | 75% |

EXAMPLES 2–15

In a manner similar to that employed in Example 1 the per cent increased efficiency of other hydrogel composites was determined. The results are set forth in Table I below. Although the efficiencies for each composite were determined for saline fluid volumes of 20, 30, 40 and 50 cc only the range is given in the Table. The first figure represents increased efficiency for 50 cc and the second figure represent the increased efficiency for 20 cc. In Examples 2–7 the fibers employed were bleached sulfate pulp fibers.

TABLE I

| Example | Hydrogel | Fiber | Ratio of Hydrogel to Fiber | Per Cent Increased Efficiency of Composite |
|---|---|---|---|---|
| 2 | Polyethylene oxide Gel I | Pulp | 3:2 | 39–102 |
| 3 | Polyethylene oxide Gel I | Pulp | 3:1 | 25–62 |
| 4 | Polyethylene Gel I | Pulp | 2.3:1 | 32–48 |
| 5 | AA/AAm | Pulp | 1:1 | 38–117 |
| 6 | Grafted Starch Polymer 35-A-100 | Pulp | 2:1 | 25–23 |
| 7 | Grafted Starch Polymer 35-A-100 | Pulp | 1:1 | 36–24 |
| 8 | Polyethylene oxide Gel I | Bleached Slufite Pulp (C-40) | 1:1 | 50.2–32 |
| 9 | Polyethylene oxide Gel I | Bleached Sulfite Pulp (C-100) | 1:1 | 42.4–4.0 |
| 10 | Polyethylene oxide Gel I | Bleached Sulfite Pulp (C-200) | 1:1 | 19.0–(−)8.0 |
| 11 | Chemically Crosslinked Poleyethylene oxide Gel II | Bleached Sulfite Pulp (RB-100) | 1:1 | 31–(−1) |
| 12 | Dow XD - 1300 | Bleached Sulfite Pulp (RB-100) | 1:1 | 42:58 |
| 13 | Dow XD - 1300 | Bleached Sulfite Pulp (RB-100) | 2:1 | 29–34 |
| 14 | Polyethylene oxide Gel I | Bleached Sulfite Hardwood Fibers (JHB) | 1:1 | 48–50 |
| 15 | Polyethylene oxide Gel I | Bleached Cotton | 1:1 | 106–100 |

TABLE I-continued

| Example | Hydrogel | Fiber | Ratio of Hydrogel to Fiber | Per Cent Increased Efficiency of Composite |
|---------|----------|-------|----------------------------|--------------------------------------------|
|         |          | Linters (Cl-100) |                 |                                            |

EXAMPLES 16–18

In a manner similar to that employed in Example 1 composites were prepared from three additional hydrogels and absorption values determined at the 20, 30, 40 and 50 cc fluid loadings. The hydrogel employed and the absorption values obtained are set forth below in Table II.

TABLE II

| Example | Hydrogel | Fiber | Ratio of Hydrogel to Fiber | Absorption Values |
|---------|----------|-------|----------------------------|-------------------|
| 16 | Hydroxyethyl Cellulose | Bleached Sulfate Pulp | 1:1 | 7.7X–7.6X |
| 17 | Carboxymethyl Cellulose | Bleached Sulfate Pulp | 1:1 | 10.5X–8.8X |
| 18 | Polyacrylamide | Bleached Sulfate Pulp | 1:1 | 11.3X–7.6X |

EXAMPLES 19–31

The following examples were conducted to show the improved retention efficiencies of the hydrogel/fiber composites when contained in a fibrous matrix. The procedure employed was as follows:

A standard Ro-Tap sieve shaker was fitted with a specially designed drum in which 11 inch × 8 inch adsorption pads could be taped in a near vertical position. After shaking the test pads for one-half hour, the loose particles were collected at the bottom of the drum. The composites or hydrogel/fiber compossites were separated from loose pad fibers and weighed. The increased retention efficiency of the hydrogel/fiber composite over the parent hydrogel was calculated in accordance with the following equation:

$$\frac{\left(\frac{\text{weight loss hydrogel}}{\text{weight initial hydrogel in pad}} - \frac{\text{weight loss hydrogel/fiber}}{\text{weight initial hydrogel/fiber in pad}}\right) \times 100}{\frac{\text{weight loss hydrogel/fiber}}{\text{weight hydrogel/fiber in pad}}}$$

In examples 19–25 the pad construction was 16 inches × 11 inches and contained 32 grams of wood pulp fluff and 1 gram of hydrogel or hydrogel/fiber composite uniformly distributed throughout the pad. In examples 25–28 the pad construction was 16 inches × 11 inches and contained 22 grams of wood pulp fluff and 2 grams of hydrogel or hydrogel/fiber composite uniformly distributed throughout the pad. In Examples 29–31 diapers having a pad construction of 6 inches × 8 inches were prepared containing 7 grams of wood pulp fluff nd 0.5 gram of hydrogel or hydrogel/fiber composite. The hydrogel or hydrogel/fiber composite was layered between two fluff pads which were embossed with a diamond grid pattern.

TABLE

| Example | Hydrogel | Ratio of Hydrogel to Fibers | Per cent Weight Loss of Hydrogel/Fiber Composite | Per cent Weight Loss of Hydrogel | Per cent Increased Retention Efficiency of Composite |
|---------|----------|------------------------------|--------------------------------------------------|----------------------------------|-------------------------------------------------------|
| 19 | Polyethylene Oxide Gel III | 1:1 | 2.18 | 10.8 | 396 |
| 20 | Polyethylene Oxide Gel III | 2:1 | 2.66 | 10.8 | 307 |
| 21 | Dow XD-1300 | 1:1 | 2.78 | 5.24 | 88 |
| 22 | Dow XD-1300 | 2:1 | 2.46 | 5.24 | 113 |
| 23 | Polyethylene Oxide Gel II | 1:1 | 2.20 | 5.86 | 166 |
| 24 | Polyethylene Oxide Gel I | 1:1 | 2.78 | 5.86 | 111 |
| 25 | Polyethylene Oxide Gel I (1) | 2:1 | 1.96 | 5.86 | 199 |
| 26 | Dow XD-1300 | 1:1 | 1.78 | 4.75 | 167 |
| 27 | Dow XD-1300 | 1:1 | 1.62 | 4.07 | 151 |
| 28 | Polyethylene Oxide Gel II | 1:1 | 2.60 | 4.61 | 81 |
| 29 | Dow XD-1300 | 1:1 | 12.8 | 27.03 | 110 |
| 30 | Polyethylene Oxide Gel | 1:1 II | 12.24 | 21.74 | 78 |
| 31 | Polyethylene Oxide Gel I | 1:1 | 12.26 | 28.44 | 132 |

(1) The differences for these examples were calculated using polyethylene oxide gel II as the reference.

Although the invention has been illustrated by the preceding examples, it is not to be construed as being limited to the materials employed therein, but rather the invention relates to the generic area as hereinbefore disclosed. Various modification and embodiments can be made without departing from the spirit and scope thereof.

What is claimed is:

1. A disposable absorbent article for body exudate having fibrous coated hydrogel particles as at least one of the absorbents contained therein; said particles having:
   a. improved in situ fluid absorption efficiencies over the corresponding non-coated particles.
   b. a particle size distribution such that essentially all of said coated hydrogel particles pass through a five mesh screen as measured on U.S. Standard Sieve Series,
c. a coating of fibers, which fibers have an average length of less than about 5.0 millimeters and an average ratio of length to diameter of at least about 5:1, and
d. at least some of said fibers having a portion thereof extending outwardly from the surface of said particles.

2. The disposable absorbent article of claim 1 wherein said fibrous coated hydrogel particles have at least some of said fibers having a portion thereof extending outwardly from the surface of said particles and defining a means for essentially imobilizing said particles in a fibrous matrix.

3. The disposable absorbent article of claim 2 wherein said fibrous matrix is cellulosic.

4. The disposable absorbent article of claim 2 wherein said fibrous matrix is wood fiber.

5. The disposable absorbent article of claim 1 wherein said fibrous coated hydrogel particles have at least some of fibers having a portion thereof extending outwardly from the surface of said particles and essentially imobilizing said particles in a cellular matrix.

6. The disposable absorbent article of claim 5 wherein said cellular matrix is a foam.

7. The disposable absorbent article of claim 5 wherein said cellular matrix is a polyurethane foam.

8. The disposable absorbent article of claim 1 which is a catamenial device.

9. The disposable absorbent article of claim 1 which is a sanitary napkin.

10. The disposable absorbent article of claim 1 which is a tampon.

11. The disposable absorbent article of claim 1 which is a diaper.

12. The disposable absorbent article of claim 1 wherein said particles are coated with at least one type of hydrophilic fibers.

13. The disposable absorbent article of claim 1 wherein said particles are coated with at least one type of hydrophobic fibers wherein at least a portion of said fiber has been rendered hydrophilic.

14. The disposable absorbent article of claim 1 wherein said particles are coated with at least one type of hydrophilic and at least one type of hydrophobic fibers.

15. The disposable absorbent article of claim 14 wherein at least a portion of said hydrophobic fiber has a portion thereof extending outwardly from the surface of said particles.

16. The disposable absorbent article of claim 1 wherein said hydrogel particles are coated with synthetic fibers.

17. The disposable absorbent article of claim 16 wherein said synthetic fibers are nylon flocs.

18. The disposable absorbent article of claim 16 wherein said synthetic fibers are rayon flocs.

19. The disposable absorbent article of claim 1 wherein said hydrogel particles are coated with natural fibers.

20. The disposable absorbent article of claim 19 wherein said natural fibers are wood pulp fibers.

21. The disposable absorbent article of claim 19 wherein said natural fibers are cotton linter flocs.

22. The disposable absorbent article of claim 19 wherein said natural fibers are cellulose flocs.

23. The disposable absorbent article of claim 1 wherein said fibers are a mixture of synthetic and natural fibers.

* * * * *